April 10, 1934.  S. C. MOON  1,954,051

DRILLING MECHANISM

Original Filed May 28, 1931

INVENTOR:
STERLING C. MOON
BY
ATTY.

Patented Apr. 10, 1934

1,954,051

UNITED STATES PATENT OFFICE 1,954,051

DRILLING MECHANISM

Sterling C. Moon, Columbus, Ohio, assignor to The Jeffrey Manufacturing Company, a corporation of Ohio Original application May 28, 1931, Serial No. 540,757. Divided and this application June 10, 1932, Serial No. 616,549

5 Claims. (Cl. 279—94)

The present invention relates to a structure particularly applicable to drills of the type used in drilling shot holes in coal faces, but it may have a general application.

One of the objects of the invention is the provision of improved and efficient means for coupling a drill holder with a drill driving screw, which permits ready attachment and detachment of the drill but which, upon reversal of the feed screw for withdrawal of the drill, will interlock the parts to effect a positive action and withdrawal of the drill.

Other objects of the invention will appear hereinafter, the novel features and combinations being set forth in the appended claims.

The present application is a division of my co-pending application, Ser. No. 540,757, filed May 28, 1931, for an improvement in Coal drills.

In the accompanying drawing, Fig. 1 is a perspective view of the improved coupling between a feed screw and coal drill;

Figure 4:
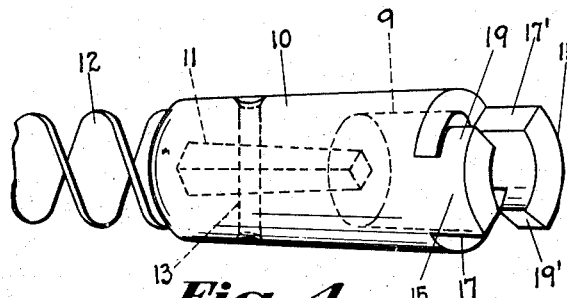
Fig. 4 is a perspective view of the other section of the coupling to show the socket which is adapted to receive the alining cylinder of Fig. 3.
Figure 3:
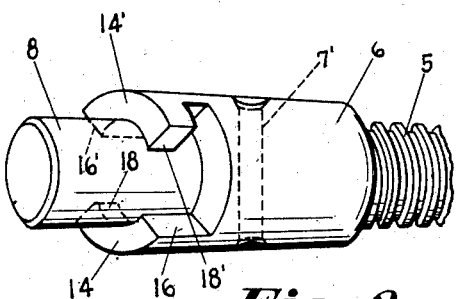
Fig. 3 is a perspective view of that section of the coupling provided with an alining cylinder.
Figure 2:
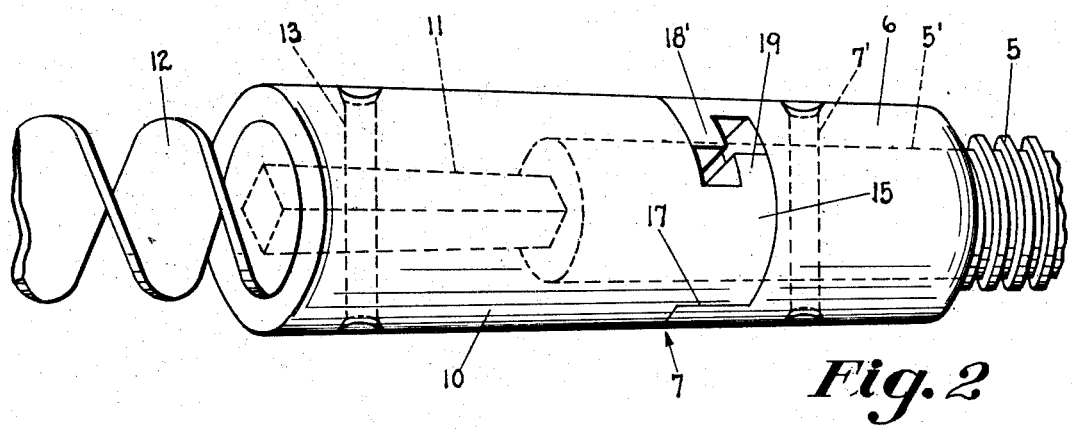
Fig. 2 is a perspective view similar to that shown in Fig. 1 but showing the coupling in operative position.
Figure 1:
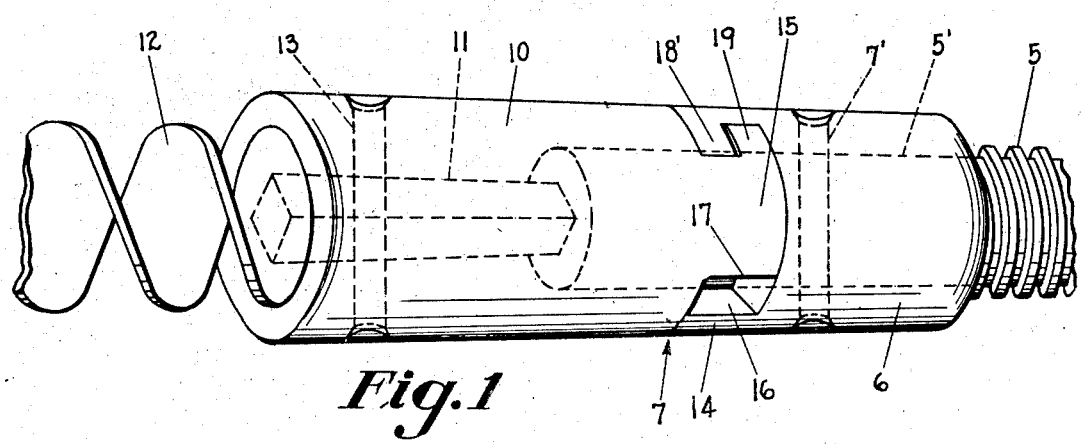

As shown in Figs. 1, 2 and 3 the forward end of the feed screw or screw shaft 5 is provided with an auger engaging driving block 6 which may be pinned or otherwise suitably secured to the shaft 5. In the drawing I have shown a transverse pin 7' permanently securing the shaft 5' to the section 6 of the coupling 7. The shaft 5' projects through the section 6 so as to afford a cylindrical alining member 8 which is adapted to fit into the cylindrical socket 9 shown in Fig. 4.

The other section 10 of the coupling 7 serves as a socket to receive the shank 11 of the coal drill 12. The shank 11 is permanently secured to the socket 10 by any suitable means such as the pin shown at 13. As shown in the drawing the shank 11 may extend into the socket 10 to the bottom of the alining socket 9.

A tongue 14 projects longitudinally from the section 6 so as to occupy an over-lapped relation with the tongue 15 which projects longitudinally in the opposite direction from the section 10. This arrangement provides abutments 16 and 17 whose opposing faces are in planes which extend radially through the axis of the feed shaft 5. Preferably the section 6 is also provided with a longitudinal projection 14' provided with an abutment face 16' diametrically opposite abutment face 16. In a similar manner the section 10 is provided with a longitudinal tongue 15' which is provided with an abutment face 17' diametrically opposite the abutment face 17.

When the sections 6 and 10 of the coupling 7 are connected by sliding the socket 9 over the cylindrical alining member 8 the tongues 15 and 15' fit between the spaces afforded by the tongues 14 and 14' on the section 6. The abutment faces 16 and 17 may then engage each other and at the same time the abutment faces 16' and 17' may engage each other.

When the feed shaft 5 is rotated to advance the auger or coal drill 12 the radial faces 16, 17 and 16', 17' come into abutting contact and therefore torque may be transmitted from the driving shaft 5 to the coal drill while at the same time feed thrust may be exerted by contact between the abutting ends of the sections 6 and 10. It should be particularly noted, however, that when the faces 16, 17 and 16', 17' are in contact the sections 6 and 10 of the coupling 7 may be disconnected or detached from each other by relative axial movement. That is to say, while the sections 6 and 7 are in such relation to each other as to enable the shaft 5 to operate the drill including forward feed thereof the feed screw upon being stopped may be withdrawn from the section 10 by sliding the section 6 axially of the drill. It is therefore obvious that whenever desired coupling may be effected by simply sliding the alining member 8 into the socket 9 while the faces 16, 16' are in position to slide along the faces 17, 17'.

After the drill 12 has been operated to produce a hole in the coal face of the desired depth and it is desired to withdraw the drill by means of power-operated mechanism applied to the screw shaft 5 the section 6 is rotated anti-clockwise so as to effect interlocking connections between the circumferential lugs 18, 18' on the tongues 14, 14' and the circumferential lugs 19, 19' on the tongues 15, 15'. The coupling afforded by relative circumferential movement of the sections 6 and 10 is of the bayonet joint type. The parts are arranged diametrically opposite each other and are so formed that there is sufficient lost motion between the tongues 14, 14' and 15, 15' to permit the auger and its socket 10 to be readily disconnected from the feed screw and the actuating section 6 when the parts are in the position shown in Fig. 2.

When the feed screw 5 is reversed for withdrawal of the auger or drill 12 the lost motion between the sections 6 and 10 will permit the section 6 to be moved to its position shown in Fig. 1 relative to the section 10 and the lugs 19 and 18' will then be in interlocking relation as shown in Fig. 1. It will thus be seen that by reversal of the rotation of the shaft 5 a positive interlocking connection will be afforded between the sections 6 and 10 so that reverse rotation of the shaft 5 will exert a torque on the drill 12 to reverse the rotation of the latter and thereby facilitate its withdrawal from the drill hole. The principal function of the bayonet joint or interlocking connections, however, is to enable pull on the shaft 5 in a direction opposite to the feed of the drill to positively pull the drill out of the drill hole. By reason of the circumferential lugs 18, 18' and 19, 19' when in interlocking relation as shown in Fig. 1 an axial pull may be exerted on the drill to pull the drill directly out of the drill hole without rotating the same.

If the drill hole is so filled with cuttings that it is difficult to remove the drill by a rectilinear pull exerted on the shaft 5 the removal of the drill may be facilitated by reversely rotating the same, this being permitted by the contacting faces of the lugs which afford a means of transmitting torque to the drill while it is being pulled out of the drill hole. However, it is desirable to leave the drill hole clean so as to be in proper condition for filling in and tamping the charge or shot. Therefore, provision is made not only for the rapid and efficient operation of the drill in driving the hole but also for the quick reversal of rotation and withdrawal of the drill by power applied to the feed screw after the drill has been driven to the desired depth to remove the drill bodily from the drill hole, at the same time bringing out with it the cuttings resulting from the drilling operation. That is to say, the drill may be moved out of the drill hole either rectilinearly while not reversely rotated or it may be moved out of the drill hole bodily while being reversely rotated, so as to cause the drill to scrape the cuttings out of the drill hole to clean it in readiness for the blasting charge.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In drilling apparatus, the combination with a feed shaft, of a drill, alining mechanism between said shaft and drill and comprising a cylindrical member fitting into a socket, torque transmitting means for rotating the drill comprising two members having abutments in planes extending radially of the axis of said shaft and engaged when said members are in drill feeding position, and a bayonet joint between said members in sufficient spaced-apart relation to said abutments to enable said members to be freely separated when said abutments are in contacting positions, said bayonet joint being engaged only when said members are in drill withdrawing position.

2. A drill comprising an auger and a feed shaft, means for connecting the auger and shaft comprising tubular blocks secured to the adjacent ends of the auger and shaft, means alining the blocks on the axis of the auger and shaft, the blocks having axially extending lapped tongues, the tongues having mutual abutment upon rotation of the feed shaft in either direction with a lost motion interval upon reversal of shaft rotation, the abutting tongue surfaces operative upon feeding rotation of the shaft being in substantially axial planes of the blocks to permit relative longitudinal displacement of the latter, the abutting tongue surfaces operative upon withdrawal rotation of the shaft having angular inter-engaged portions preventing relative longitudinal displacement of the blocks.

3. A drill comprising an auger and a feed shaft, means for connecting the auger and shaft comprising tubular blocks secured to the adjacent ends of the auger and shaft, the shaft extending through the block secured thereto and into the block secured to the auger to align the blocks on the axis of the auger and shaft, the blocks having axially extending lapped tongues, the tongues having mutual abutment upon rotation of the feed shaft in either direction with a lost motion interval upon reversal of shaft rotation, the abutting tongue surfaces operative upon feeding rotation of the shaft being in substantially axial planes of the blocks to permit relative longitudinal displacement of the latter, the abutting tongue surfaces operative upon withdrawal rotation of the shaft having angular inter-engaged portions preventing relative longitudinal displacement of the blocks.

4. A coupling for drills comprising two sections having interfitting tongues each with a thrust face in a plane at right angles to the axis of the coupling and a driving face in an axial plane, and a bayonet joint operable only upon separating said driving faces by relative rotation to interlock said sections to enable axial pull in a direction opposite to the thrust feed to remove the drill from its hole, said sections being separable by direct axial displacement when in feeding relation.

5. A coupling for drills comprising two sections each provided with spaced tongues diametrically opposite each other, said tongues being adapted to be brought into interfitting driving and feed thrust relation, and bayonet joints between the tongues on one section and the tongues on the other section operable only upon moving said sections by relative rotation out of driving relation to enable a pull opposite to the feed direction to remove the drill from its drill hole, said sections being separable by direct axial displacement when in feeding relation.

STERLING C. MOON.